United States Patent
Sichirollo et al.

(10) Patent No.: US 12,181,185 B2
(45) Date of Patent: Dec. 31, 2024

(54) RECEIVER FOR SOLAR CONCENTRATION SYSTEMS AND PROCESS FOR REALIZING SAID RECEIVER

(71) Applicant: GREENETICA DISTRIBUTION S.R.L., Abano Terme (IT)

(72) Inventors: Antonio Sichirollo, Montebelluna (IT); Andrea Biasutti, Pordenone (IT)

(73) Assignee: GREENETICA DISTRIBUTION S.R.L., Abano Terme (IT)

(*) Notice: Subject to any disclaimer, the term of this patent is extended or adjusted under 35 U.S.C. 154(b) by 0 days.

(21) Appl. No.: 18/252,251

(22) PCT Filed: Aug. 23, 2021

(86) PCT No.: PCT/IB2021/057716
§ 371 (c)(1),
(2) Date: May 9, 2023

(87) PCT Pub. No.: WO2022/101695
PCT Pub. Date: May 19, 2022

(65) Prior Publication Data
US 2023/0417454 A1 Dec. 28, 2023

(30) Foreign Application Priority Data
Nov. 13, 2020 (IT) .................. 102020000027218

(51) Int. Cl.
*F24S 20/20* (2018.01)
*F24S 23/70* (2018.01)
(Continued)

(52) U.S. Cl.
CPC .............. *F24S 20/20* (2018.05); *F24S 80/50* (2018.05); *H02S 10/10* (2014.12); *H02S 40/22* (2014.12); *H02S 40/40* (2014.12); *F24S 23/70* (2018.05)

(58) Field of Classification Search
CPC .. F24S 20/20; F24S 23/70; F24S 23/74; F24S 30/425; F24S 40/80; F24S 80/50;
(Continued)

(56) References Cited

U.S. PATENT DOCUMENTS 4,139,270 A * 2/1979 Dotson .................. F24S 40/80
359/867
4,532,916 A 8/1985 Aharon
(Continued)

FOREIGN PATENT DOCUMENTS

EP 1852918 A2 11/2007
ES 2337332 B1 6/2011
(Continued)

OTHER PUBLICATIONS

The International Search Report and Written Opinion, mailed Nov. 23, 2021 to Greenetica Distribution S.R.L. for International Application No. PCT/IB2021/057716.
(Continued)

*Primary Examiner* — Golam Mowla
(74) *Attorney, Agent, or Firm* — Vorys, Sater, Seymour and Pease LLP

(57) ABSTRACT

A receiver for solar concentrating systems including a container including at least one transparent wall configured to receive solar rays from a solar concentrator and defining at least one cavity housing, a conversion module configured to convert solar energy taken from the solar rays into thermal and/or electrical energy and housed within part of the cavity close to the wall and separated from the wall by a slot, and transparent optical gel housed within the cavity and configured to completely occupy at least the slot to shield the conversion module.

9 Claims, 2 Drawing Sheets

Figure 1:
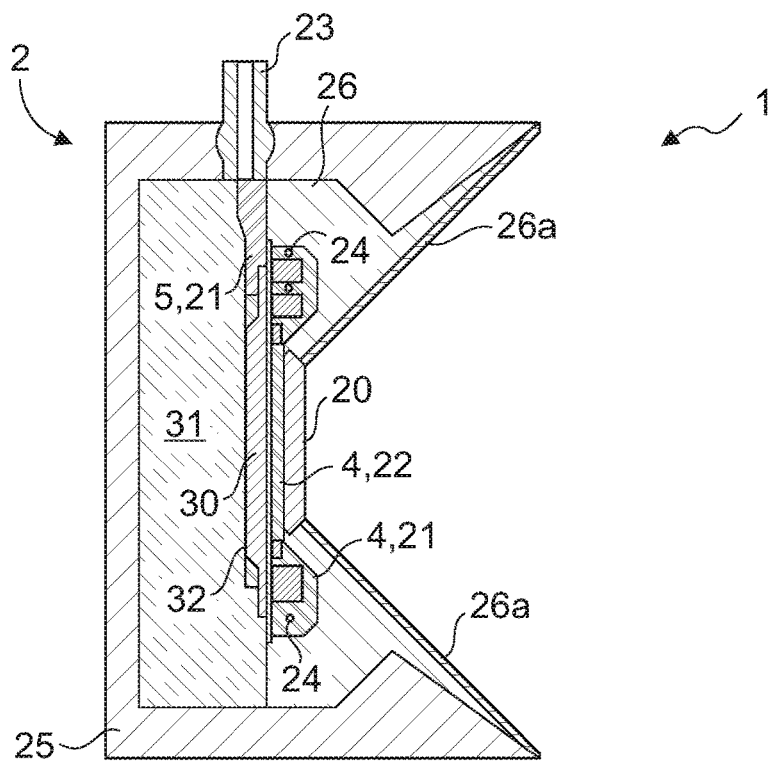

(51) Int. Cl.
*F24S 80/50* (2018.01)
*H02S 10/10* (2014.01)
*H02S 40/22* (2014.01)
*H02S 40/40* (2014.01)

(58) Field of Classification Search
CPC .......... H02S 10/10; H02S 40/22; H02S 40/40; H02S 40/44
See application file for complete search history.

(56) References Cited

U.S. PATENT DOCUMENTS

| | | | |
|---|---|---|---|
| 9,194,378 | B2 | 11/2015 | Sayer et al. |
| 2009/0078303 | A1 | 3/2009 | Brezoczky et al. |
| 2010/0206356 | A1 | 8/2010 | Cheung et al. |
| 2011/0023390 | A1* | 2/2011 | Kneip .................. F24S 25/61 52/173.3 |
| 2012/0266938 | A1 | 10/2012 | Goei et al. |
| 2013/0276775 | A1 | 10/2013 | Stettenheim et al. |
| 2015/0252792 | A1 | 9/2015 | Saito et al. |
| 2016/0056758 | A1* | 2/2016 | Gilbert ............... G02B 19/0042 136/246 |
| 2017/0179879 | A1 | 6/2017 | Hendricks et al. |

FOREIGN PATENT DOCUMENTS

| | | |
|---|---|---|
| ES | 2362914 A1 | 7/2011 |
| WO | 2005116534 A2 | 12/2005 |
| WO | 2009048879 A2 | 4/2009 |
| WO | 2013014998 A1 | 1/2013 |
| WO | 2022101696 A1 | 5/2022 |
| WO | 2022106918 A1 | 5/2022 |

OTHER PUBLICATIONS

The Search Report, completed Jul. 2, 2021 for Italian Application No. 102020000027218.

* cited by examiner

RECEIVER FOR SOLAR CONCENTRATION SYSTEMS AND PROCESS FOR REALIZING SAID RECEIVER

The present invention relates to a receiver for solar concentrating systems and process for realizing said receiver of the type specified in the preamble of the first claim.

In particular, the present invention relates to a receiver, and related realization process, configured to receive solar rays reflected from a reflecting surface and to convert solar energy into usable energy, for example electrical and/or thermal.

As known, solar concentrators or solar concentrating systems, also known by the acronym CSP (Concentrating Solar Power), allow you to convert solar energy into thermal and/or electrical energy by exploiting the reflection of sunlight obtained through generally reflective surfaces. consisting of mirrors.

Such mirrors can define various shapes and sizes. Among the most used reflectors there are certainly cylindrical reflectors, parabolic reflectors and paraboloid reflectors.

The reflecting surfaces are, therefore, configured to concentrate the sun's rays on a small receiver. The concentration mode, in detail, may depend on the shape of the reflectors which can reflect the sun's rays along a linear acquisition zone or along a point-like acquisition zone.

Generally, once the rays are concentrated in the acquisition area, the solar radiation is converted into electricity and/or the heat is converted into mechanical energy by means of a heat engine, for example consisting of a steam turbine, to whose driving axis it is connected the axis of an electric generator.

In particular, the motor axis and the generator axis can be mutually connected in an integral or proportional manner, for example by means of a mechanical transmission.

More in detail, generally, the receivers can comprise photovoltaic cells for concentration and sometimes even multi-junction suitable for converting concentrated solar radiation. The non-converted part of solar radiation, such as the infrared, substantially heats the cell and the support structure to which the cell is anchored at high temperatures.

The known technique described therefore comprises some important drawbacks.

In particular, the rise in temperature makes it necessary to dispose of heat by dispersion in the air or, more preferably, by ad hoc cooling circuits.

Furthermore, the thermal stress to which the entire receiver structure is subjected can lead to dilations between the various components. Since the latter are of different nature and materials, the expansions can be so different as to cause internal detachments between the components. Furthermore, some components can even come close to their own melting point with the risk of generating enormous damage to the system.

The photovoltaic cells, in addition, must be protected from external atmospheric agents in order to guarantee good efficiency and durability.

In this situation, the technical task underlying the present invention is to devise a receiver for solar concentration systems and a process for manufacturing said receiver capable of substantially obviating at least part of the aforementioned drawbacks.

Within the scope of said technical task, it is an important object of the invention to obtain a receiver for solar concentration systems, and related manufacturing process, which is able to limit the temperature increases of its internal structure dependent on heat deriving from solar radiation not converted into electricity.

Another important object of the invention is to provide a receiver for solar concentrating systems which allows the photovoltaic cells present in the receiver to be efficiently shielded so as to maintain high levels of efficiency and durability.

The technical task and the specified aims are achieved by a receiver for solar concentrating systems, and related manufacturing process, as claimed in the annexed claim 1.

Preferred technical solutions are highlighted in the dependent claims.

Figure 2:
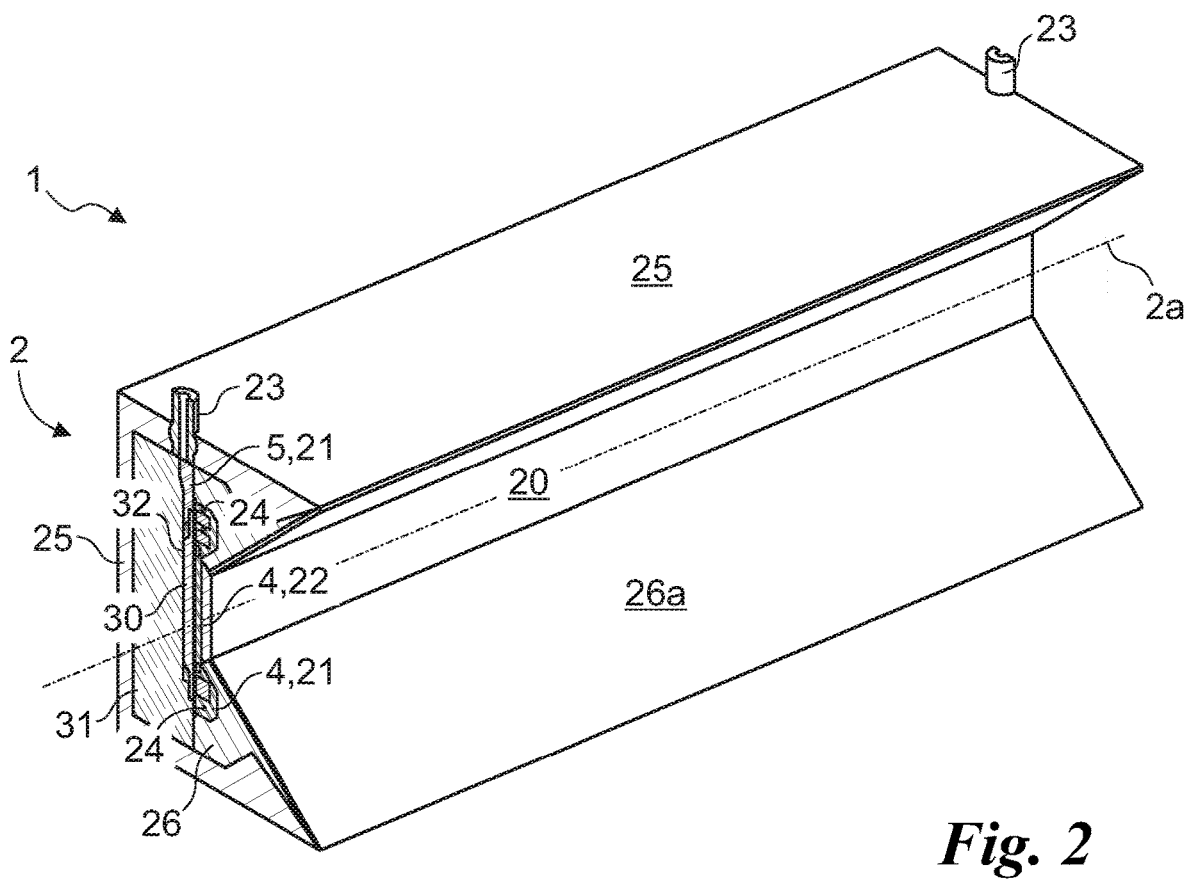
Figure 3:
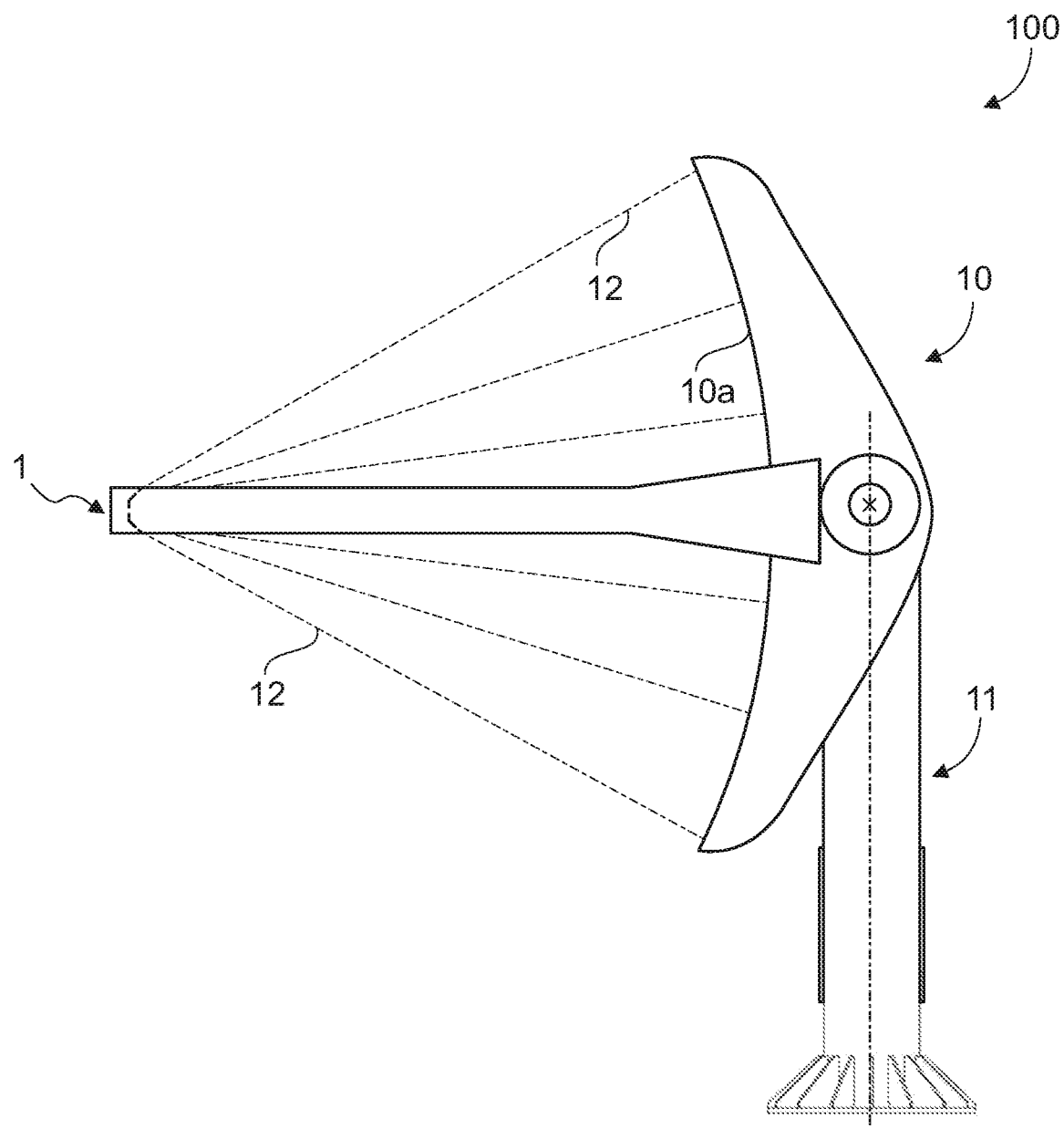

The characteristics and advantages of the invention are clarified below by the detailed description of preferred embodiments of the invention, with reference to the accompanying figures, in which:

the FIG. 1 shows a side sectional view of a receiver for solar concentrating systems according to the invention;

the FIG. 2 illustrates a perspective view of a receiver for solar concentrating systems according to the invention; and the FIG. 3 is a side view of a solar concentrating power system comprising a concentrator including a receiver for solar concentrating systems according to the invention.

In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer systems, registers or other storage, transmission or information displaying devices.

The measurements and data reported in this text are to be considered, unless otherwise indicated, as performed in the International Standard Atmosphere ICAO (ISO 2533:1975).

With reference to the Figures, the solar concentrating systems according to the invention is globally indicated with the number 1.

The receiver 1 is substantially adapted to be inserted inside solar concentrating systems. Therefore, it can be part of a solar concentrating system which includes, in fact, the receiver 1 and a solar concentrator 100.

The solar concentrator 100 is substantially configured to concentrate solar rays 12 in a predetermined point or zone so as to acquire concentrated solar energy.

In particular, preferably the concentrator 100 can comprise a support 11.

The support 11 is substantially an element that allows one or more components to be supported in elevation on a ground. Therefore, the support 11 itself is able to be positioned on the ground and, preferably, constrained thereon.

The support 11 can therefore substantially be a long object extending along its own axis, for example a cylindrical object such as a pole or a pylon.

The concentrator 100 also comprises at least one reflecting mirror 10.

The mirror 10 is substantially a reflecting device configured to receive solar rays 12 and reflect them on the basis of predetermined and material-dependent reflection angles.

Reflecting devices for concentrators are well known in the current state of the art.

The mirror 10 is preferably constrained in a compliant way to the support 11. In particular, preferably, the mirror 10 is constrained to the support 11 in such a way as to determine at least one degree of freedom, preferably two, with respect to said support 11.

In particular, the mirror 10 it is configured to reflect the solar rays 12 towards the receiver 1.

The receiver 1 preferably comprises a container 2.

The container 2 is substantially preferably a box-like element. In this regard, the container 2 can be made in one piece or can be determined by a plurality of components.

Essentially, preferably, the container 2 comprises at least one wall 20.

The wall 20 is suitably transparent. In fact, the wall 20 is configured to receive solar rays 12 from the solar concentrator 100.

The wall 20, therefore, allows the solar rays 12 to penetrate into the container 2 so that the solar rays 12 can be converted into usable energy.

In detail, the solar rays 12 are stored in a cavity 21 of housing.

The container 2 in fact defines the housing cavity 21. The cavity 21 is substantially an internal part of the container 2, accessible from the solar rays 12 thanks to the wall 20, and configured to house the components of the receiver 1.

The receiver 1 also comprises a conversion module 3.

The conversion module 3 is configured to convert solar energy taken from the solar rays 12 into thermal energy and/or electrical energy.

Therefore, the conversion module 3 is suitably housed within the cavity 21 close to the wall 20.

Furthermore, the conversion module 3 is preferably separated from the wall 20 by a slot 22.

The slot 22 is, therefore, a portion of cavity 21 arranged between the wall 20 and the conversion module 3.

Even more in detail, the conversion module 3 can be structured in various ways.

For example, it can allow the generation of electricity from solar radiation through photovoltaic systems. In this sense, the conversion module 3 can comprise a first acquisition device 30.

The first acquisition device 30 is preferably photovoltaic. Therefore, suitably, it faces, if present, on the wall 20. The first acquisition device 30 can therefore comprise a ceramic support on which various multi-junction cells, diodes, connectors, various electrical circuit components and other components are arranged.

Alternatively, the conversion module 3 can be configured to convert the thermal energy developed by the solar rays 12 into electrical energy.

Therefore, the conversion module 3 can include a second acquisition device 31.

The second acquisition device 31 is therefore configured to acquire heat. For example, it can comprise at least one heat exchanger including fins or micro-channels.

Advantageously, the receiver 1 is, in the preferred but not exclusive embodiment, configured to generate both electrical energy and thermal energy from the solar rays 12.

Therefore, preferably, the conversion module comprises the first acquisition device 30 and the second device. acquisition device 31.

Furthermore, the second acquisition device 31 is configured to acquire heat from the first acquisition device 30.

Even more in detail, the second acquisition device 31 comprises a micro-channel heat exchanger arranged in contact with the first acquisition device 30 on a side opposite to the slot 22.

Preferably, the first and second devices 30, 31 are mutually connected by means of an adhesive layer 32.

The adhesive layer preferably includes polymeric gel. In particular, for example, the adhesive layer 32 may comprise a material marketed as DOWSIL™ SE 4450 Thermally Conductive Adhesive.

Advantageously, the receiver 1 also comprises transparent optical gel 4.

The gel 4 is substantially a fluid element, preferably of the silicone type. For example, the gel 4 may be of the type marketed as SYLGARD™ 527 Silicone Dielectric Gel.

The gel 4 is therefore housed within the cavity 21.

In particular, advantageously, the gel 4 is configured to completely occupy at least the slot 22. In this way, the gel 4 is able to shield the conversion module 3.

Again, more preferably, the gel 4 completely occupies the part of the cavity 21 not occupied by the conversion module 3. In this way the gel 4 allows to eliminate any empty space within the cavity 21.

Above all in order to facilitate the introduction of gel 4 into the cavity 21, the container 2 can include some other particular devices.

Preferably, the container 2 comprises accesses 23.

The accesses 23 are preferably in connection of fluid passage with the cavity 21.

They are, therefore, configured to allow the introduction or expulsion of gel 4 into the cavity 21 or from the cavity 21.

They can therefore consist of a perforated connector arranged along the external perimeter of the container 2.

The receiver 1 can therefore comprise caps 5.

The caps 5 are preferably arranged close to each access 23.

The caps 5 are also configured to seal the accesses 23 so as to hermetically close the gel 4 within the cavity 21.

The caps 5 can be physical caps. Or, preferably, the caps 5 can be made with a second polymeric gel. Preferably, the gel included in the caps 5 has less elasticity and expandability due to heat than the gel 4.

An example of a gel suitable for the caps 5 is marketed as DOWSIL™ SE 9186 Black, Clear or White Adhesive.

Since the gel 4 is endowed with particular expandability, especially with respect to the adhesive layer 32 and the caps 5, preferably the container 2 can include further components capable of absorbing the expansions of the gel 4.

Preferably, the container 2 comprises one or more bearings 24.

The bearings 24 are, in particular, housed within the cavity 21. Furthermore, they are configured to expand proportionally to the gel 4. The term proportional does not mean that the expansion is the same, but rather that the expansion is opposite to that of the gel 4. In this way, the pads 24 can compensate for any expansion of the gel 4 itself.

For example, if the gel 4 expands due to the heat input, the bearings 24 tend to compress proportionally in order to avoid generating too high internal pressures in the container 2.

Naturally, the container 2 can assume various shapes and sizes.

In the preferred but not exclusive embodiment, the container 2 defines an extension axis 2a.

The extension axis 2a extends in such a way as to be substantially parallel to the expansion axis of the mirror 10 when the receiver 1 is in use on the concentrator 100.

Furthermore, preferably, the wall 20, the cavity 21 and the conversion module 3 extend along the extension axis 2a.

Furthermore, preferably, especially to facilitate the realization of the receiver 1, the accesses 23 are two in number and are arranged at two opposite ends, along the extension axis 2a, of the container 2.

The bearings 24 can, therefore, be elastic tubular elements extending parallel to the extension axis 2a.

As already mentioned, the container 2 can be made by coupling several parts. For example, the container 2 can include an insulating portion 25 and a profiled cover 26 configured to close the insulating profile 25 and define the cavity 21.

In this sense, the wall 20 can be constrained to the profiled cover 26. Furthermore, the profiled lid 26 can define a duct diverging from the wall 20 towards the outside.

The diverging duct can therefore be delimited laterally by secondary optical mirrors 26a.

In any case, arrangements of this type are already known in the current state of the art.

The operation of the receiver 1 for solar concentrating systems previously described in structural terms is substantially similar to the operation of any receiver with important differences in terms, more than anything else, of efficiency and longevity.

The invention comprises a new process for realization of the receiver 1.

In particular, the process comprises at least one preparation phase.

In the preparation phase, the receiver 1 is arranged within a pressure controlled in connection with a fluid passage through one of the accesses 23 with an external container including gel 4.

The chamber can be a pressurized case inside which it is possible to vary the pressure. The external container can be any tank.

Preferably, the pressure of the external container can also be controlled in such a way as to be able to manage the flow of the gel 4 between the external container and the receiver 1 by varying the pressure.

In other words, an external container and container 2 are provided with a hydraulic circuit within which gel 4 can flow under pressure.

The process therefore includes a degassing phase. In the degassing phase, the gel 4 is degassed under low pressure inside the outer container.

For example, the pressure used can be a few mbar so that it is almost close to empty.

The process therefore includes a depressurization phase. In the depressurization phase, the chamber is depressurized in such a way as to achieve a lower pressure than the external container. For example, the pressure can be equal to zero, that is, a vacuum can be created in the chamber.

Then, in the depressurization phase, the gel 4 is pushed to enter the cavity 21 through the access 23.

Thus, the process comprises a waiting phase. In the waiting phase, it is expected that the gel 4 saturates the cavity entirely and reaches the other access 23.

Preferably, the waiting phase is slow, so as to facilitate the complete filling of the cavity 21 and reduce the possibility of air bubbles. The slowness of the percolation of the gel 4 is, in particular, facilitated by reduced pressure rates between the pressure of the external container and the pressure in the chamber. For this reason, preferably, the pressure of the external container is increased at most at contained or very low pressures, for example by only 1 mbar.

The process can therefore include a further capping phase.

The capping phase is preferably carried out once the waiting phase has ended. In the capping phase, the accesses 23 are preferably plugged with the caps 5 in such a way as to seal the gel 4 in the cavity 21.

The receiver for solar concentration systems 1, and its manufacturing process, according to the invention, achieves important advantages.

In fact, the conformation of the receiver 1 allows to limit the temperature increases of the internal structure dependent on heat deriving from solar radiation not converted into electrical energy.

The transparency guaranteed by the gel 4 and the complete saturation of the cavity 21 guarantee that there are no damage phenomena on the photovoltaic panels.

Furthermore, the dissipation of heat is further facilitated by the adhesive layer 32.

The receiver 1, and the related manufacturing process, also allow the photovoltaic cells to be efficiently shielded so as to maintain high efficiency levels.

The expansions of the gel 4, at the same time, are compensated by the bearings 24 and, therefore, even phenomena of detachment of the parts inside the receiver 1 itself cannot be established.

The invention is susceptible of variants falling within the scope of the inventive concept defined by the claims.

In this context, all the details can be replaced by equivalent elements and the materials, shapes and dimensions can be any.

The invention claimed is:

1. A receiver for solar concentrating systems comprising:
   a container including at least one transparent wall configured to receive solar rays from a solar concentrator and defining at least one cavity of housing,
   a conversion module configured to convert solar energy taken from said solar rays into thermal and/or electrical energy and housed within a part of said cavity close to said wall and separated from said wall by a slot, and
   transparent optical gel housed within said cavity and configured to completely occupy at least said slot so as to shield said conversion module,
   wherein said container comprises one or more bearings housed within said cavity and configured to expand in proportion to said gel in such a way that compensate eventual dilations of said gel.

2. The receiver according to claim 1, wherein said gel completely occupies the part of said cavity not occupied by said conversion module in such a way as to eliminate any empty space within said cavity.

3. The receiver according to claim 1, wherein said container comprises accesses in fluid flow connection with said cavity and configured to allow the entry or the expulsion of said gel in or from said cavity and said receiver further comprises caps arranged close to each said access and configured to seal said accesses so as to hermetically close said gel within said cavity.

4. The receiver according to claim 1, wherein said conversion module comprises at least a first photovoltaic acquisition device facing said wall and a second thermal acquisition device configured to acquire heat from said first acquisition device.

5. The receiver according to claim 1, wherein said second acquisition device comprises a heat exchanger arranged micro-channels in contact with said first acquisition device on an opposite side with respect to said slot.

6. The receiver according to claim 3, wherein said container defines an extension axis along which extend said wall, said cavity and said conversion module, said accesses are two in number and arranged at two opposite ends, along said extension axis, of said container and said bearings are elastic tubular elements extending parallel to said extension axis.

7. A solar concentrating system comprising a receiver according to claim 1 and a concentrator including a support and a mirror configured to reflect said solar rays towards said receiver.

8. A process for realization of a receiver according to claim 6, comprising:

arranging said receiver within a controllable pressure chamber in connection of fluid passage through one of said accesses with an external container including said gel, degas said gel at low pressure inside said external container, depressurize said controllable pressure chamber in such a way as to create a lower pressure than the external container and push said gel to enter said cavity through said access, wait for said gel to completely saturate said cavity and reach the other of said accesses.

9. The process according to claim 8, comprising:

plugging said accesses with said caps at the end of said waiting phase in such a way as to seal said gel within said cavity.

* * * * *